UNITED STATES PATENT OFFICE.

HUBERT CLAUS, OF THALE-IN-THE-HARZ, GERMANY.

METHOD OF ENAMELING SHEET-METAL WARE.

SPECIFICATION forming part of Letters Patent No. 466,325, dated January 5, 1892.

Application filed July 31, 1891. Serial No. 401,289. (Specimens.)

*To all whom it may concern:*

Be it known that I, HUBERT CLAUS, a resident of Thale-in-the-Harz, Germany, have invented a new and useful Improvement in the Process or Method of Enameling Sheet-Metal Ware, of which the following is a specification.

My invention relates to certain new and useful improvements in enameled sheet-metal ware, and has for its object the enameling in mottled or variegated colors sheet-metal utensils and the like by an improved process or method, hereinafter more fully described.

The article to be enameled is first treated to a preliminary bath or coating of enamel or glaze. The preliminary coating or glaze has a composition similar to that of the ordinary base metal used for sheet-metal ware. The article thus coated is then washed or suitably moistened with a solution of Epsom salts and ammonia sulphate in water. This solution acts as a repellent for the next coating of enamel placed upon the article, which consists of a grayish-colored glaze or enamel composed of feldspar, quartz, borax, soda, cryolite, oxide of tin, (or phosphate of lime,) and saltpeter diluted or mixed with water. This second coating of enamel, contrary to what has hitherto been done, is ground coarse, round, or gravelly, and forms a dilute or very thin mixture with the water. The repellent wash, acting upon this second coating, causes it to assume varying degrees of thickness, thereby producing varying degrees of shade, imparting a cloudy appearance, and the gravelly form of the enamel heightens this effect of unevenness even after both coatings of enamel have been molten together in the process of firing. A third coating of enamel is next applied to the article, which coating is pliant, shining, translucent, and of a light-gray color. This coating is composed, preferably, of feldspar, fluor-spar, quartz, soda, borax, cryolite, and saltpeter ground with water into as fine a paste as possible, and is applied in a thin layer.

It is obvious that the groundwork or first coating of enamel may be of any color—white, blue, &c.—and that this color in the finished article will be modified and variegated by the varied thickness of the second coating.

Having thus described my invention, what I claim is—

The process of enameling sheet-metal articles in clouded or variegated colors, which consists in, first, coating the article with a groundwork of enamel; second, treating the surface thus coated with a repellent solution of ammonia sulphate and Epsom salts; third, coating the article with a coarsely-ground gray enamel, and finally glazing or coating the article with a thin paste of translucent enamel, substantially as described.

HUBERT CLAUS.

Witnesses:
 TH. BRELUNSATLZ,
 G. WESEMEYER.